E. I. BLOUNT.
DOOR CHECK AND CLOSER.
No. 11,537. Reissued May 5, 1896.
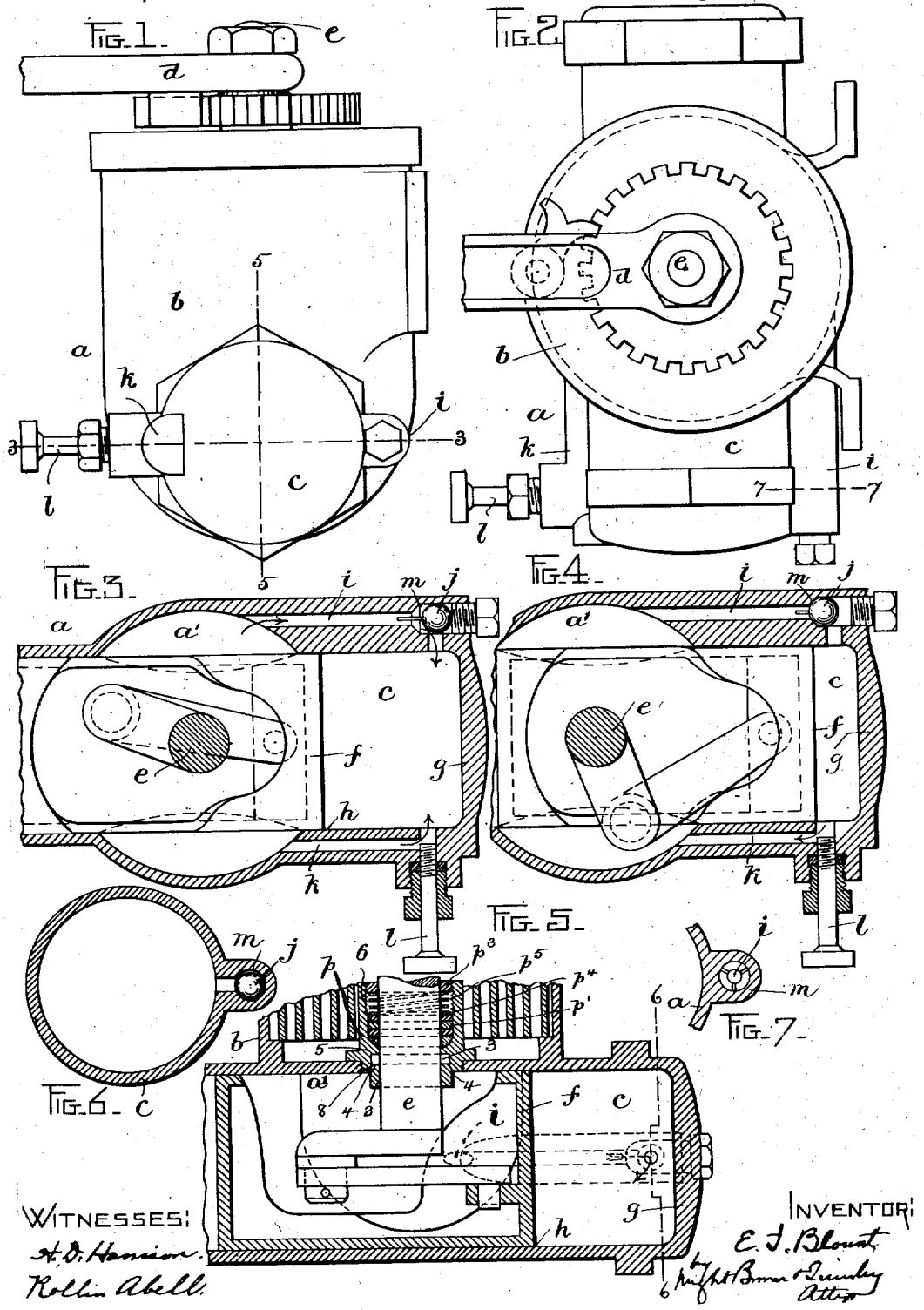
WITNESSES:
H. D. Harrison
Rollin Abell
INVENTOR:
E. I. Blount
by Wright Brown & Quinby
Attys

UNITED STATES PATENT OFFICE.

EUGENE IRVING BLOUNT, OF GARDNER, MASSACHUSETTS, ASSIGNOR TO THE BLOUNT MANUFACTURING COMPANY, OF BOSTON, MASSACHUSETTS.

DOOR CHECK AND CLOSER.

SPECIFICATION forming part of Reissued Letters Patent No. 11,537, dated May 5, 1896.

Original No. 542,791, dated July 16, 1895. Application for reissue filed April 4, 1896. Serial No. 586,262.

*To all whom it may concern:*

Be it known that I, EUGENE IRVING BLOUNT, of Gardner, in the county of Worcester and State of Massachusetts, have invented certain new and useful Improvements in Door Checks and Closers, of which the following is a specification.

This invention has relation to contrivances employing liquid in a manner to insure the closing of doors without slamming, the liquid coöperating with a piston.

It is the chief object of the invention to avoid resistance to the opening of the door by insuring the presence of an efficient body of liquid in the space made by the retreating piston, to obviate an air-space.

To these ends the invention consists in the improvements which I will now proceed to describe and claim.

Reference is to be had to the annexed drawings, and to the letters and figures marked thereon, forming a part of this specification, the same letters and figures designating the same parts or features, as the case may be, wherever they occur.

Of the drawings, Figure 1 is an end elevation of a door check and closer embodying my invention. Fig. 2 is a top plan view, parts being represented as broken away. Fig. 3 is a longitudinal sectional view taken on the line 3 3 of Fig. 1, the piston being shown as just arriving at the extremity of its outward movement. Fig. 4 is a view similar to Fig. 3, showing the piston at the other extremity of its movement. Fig. 5 is a vertical sectional view taken on the line 5 5 of Fig. 1. Fig. 6 is a cross-sectional view taken on the line 6 6 of Fig. 5. Fig. 7 is a sectional detail view taken on the line 7 7 of Fig. 2, showing the form of the valve-seat.

In the drawings, *a* designates the inclosing casing, which comprises the spring-chamber *b*, the liquid-space *a'* under said chamber, and the cylinder *c*, extending outwardly from said liquid-space.

*d* is the arm connected with the spindle *e* and the spring by usual or suitable means, and in like manner connected to the door.

*f* is the piston, which is arranged to be reciprocated in the cylinder between the end *g* and the point or line *h*, the stroke of the piston being of such length relatively to the length of the cylinder that the piston at all times constitutes a closely-fitting partition across the cylinder, preventing movement of the liquid into the outer end of the cylinder excepting through the by-passes hereinafter described. The piston may be reciprocated by means of a crank-and-pitman connection with the spindle *e*, as herein shown, or in any other suitable or known way.

*i* designates a comparatively large or free passage-way or by-pass connecting the liquid-space *a'* at one side of the piston with the outer end of the cylinder *c* at the opposite side of the piston, the said by-pass being provided with a suitable valve (herein shown as a ball-valve *j*) so constructed and arranged that when the piston *f* is moved toward the liquid-space *a'* by the opening of the door to which the device may be attached, the said valve will be automatically opened, and when the piston is moved in the opposite direction by the door-closing spring the said valve will be closed. The by-pass *i* communicates with the liquid-space *a'* at a point below the top of the latter, so that in the event of leakage or evaporation of the liquid from said space, causing an air-space above the liquid, there will be no corresponding air-space in the cylinder so long as the liquid in the space *a'* remains above the end of the by-pass. I denominate the by-pass *i* the "flow" by-pass to distinguish it from the return by-pass hereinafter described.

*k* designates a second and restricted passage-way or by-pass also connecting the liquid-space with the outer end of the cylinder. The said by-pass *k* is controlled as to the extent to which fluid may pass therethrough by a valve *l* of suitable character, herein shown as a screw-valve, and need not necessarily be automatic in its operation. The function of the by-pass *k* being to return the liquid at a relatively slow rate from the cylinder to the liquid-space, I denominate it the "return" by-pass.

Both of the by-passes are shown as formed in the sides of the casing outside of the piston; but the form and arrangement of the said by-passes is not of the essence of my present improvement, it being necessary only that they should connect the outer end of the cylinder at one end of the piston with the liquid-space $a'$ at the opposite side of the piston and that they be located a sufficient distance below the top of the cylinder to keep their outer ends in constant communication with liquid in the chamber and prevent such loss of liquid as will be likely to occur from uncovering the said by-passes, the object being to prevent air from being sucked through said by-passes to the outer end of the cylinder when the door is being opened.

With this construction and arrangement of parts it will be seen that when the door is opened and the piston is drawn toward the liquid-space $a'$, as represented in Figs. 3 and 5, the liquid in advance of the piston will be freely drawn or sucked through the by-pass $i$ to the outer end of the cylinder, the valve $j$ moving back from its seat $m$. (See Fig. 3.) A limited quantity of the liquid may also flow through the restricted by-pass $k$, as shown by the arrows in Fig. 3. By these means the door may be opened without material resistance.

When the door is released, the action of the spring will tend to close the same, and the tendency of the liquid to flow back through the by-passes to the liquid-space $a'$ will force the valve $j$ to its seat $m$, (see Fig. 4,) and the only course for the liquid will be by way of the restricted by-pass $k$, checking the force of the spring in the usual way and allowing the door to be closed without slamming. It will be seen that by this construction I avoid a valve or valves and corresponding ports in the piston, the piston being solid or valveless, so that it prevents any movement of liquid through it, the only transfer of liquid from one side of the piston being through the by-passes. Hence, when the piston is moving outwardly during the operation of opening the door liquid is drawn or sucked by the piston through the by-pass $i$ into the outer end of the cylinder, and said outer end is therefore kept full of liquid.

The chief advantage of the described improvement is that the height of the liquid forced into the outer end of the cylinder by the piston during the opening movement of the door is not limited by the height of the liquid in the liquid-space $a'$ so long as the accumulation of liquid in said space is sufficient to cover the ends of the by-passes. In other words, the suction or vacuum caused in the outer end of the cylinder will cause the latter to be filled with liquid without regard to the height of the liquid in the space $a'$ so long as the by-passes are below the liquid in the said space. The level of the liquid in the space $a'$ is liable to be reduced by evaporation or leakage after long-continued use. If the liquid were transferred to the outer end of the cylinder through a valved orifice in the piston, its level in the outer end of the cylinder would necessarily be the same as that in the liquid-space $a'$. Hence there would necessarily be a quantity of air in the outer end of the cylinder when the door is opened corresponding to the height of the liquid in the space $a'$. It will be seen, however, that there can be a considerable loss of liquid from the casing without permitting the entrance of air into the outer end of the cylinder when the door is being opened. This is an important advantage, since it greatly prolongs the period of usefulness of a charge of liquid and renders it unnecessary to recharge, excepting at long intervals.

Another advantage is the absence of any considerable force or pressure on the liquid in the space $a'$ by the piston when the door is being opened. When the displaced liquid is compelled to pass through a valved port in the piston while the latter is moving forward, there is more or less pressure exerted by the piston on the liquid in the liquid-space $a'$, tending to cause leakage of the liquid through the packing of the spindle $e$ into the spring-chamber, particularly when there is a full charge of liquid. This tendency I avoid, because the liquid displaced by the piston is drawn away from the packing of the spindle $e$ to the outer end of the cylinder, there being no pressure of the liquid toward said packing, the piston acting to exhaust the liquid from the liquid-space.

The spindle $e$ passes through a packing-nut $p$, which is formed in a single piece and comprises the lower portion 2, closely fitting the spindle, the annular chamber 3, located above said lower portion and communicating with the interior of the nut, said chamber receiving the liquid that may find its way upwardly between the spindle and the portion 2 of the nut, the backflow-ports 4 for the return of the liquid to the main liquid-space, the inwardly-projecting flange 5 above the liquid-chamber 3, and the packing-chamber 6 above the said flange. The nut also has an external screw-thread 8, whereby it is screwed into the partition separating the spring-chamber from the liquid-chamber of the casing.

The chamber 6 is formed to hold packing material $p'$, preferably in the form of rings of leather, around the piston. An annular adjusting-follower $p^8$ is screwed into the upper end of the nut, the latter being internally screw-threaded to engage the nut $p^3$. A metal washer $p^4$ bears on the packing, and between said washer and the follower is interposed a helical spring $p^5$, which exerts a downward pressure on the packing through the washer $p^4$ and keeps the packing compressed around the spindle. The follower $p^3$ may be adjusted from time to time to increase the pressure of the spring on the packing as may be required, said follower being provided with slots in its upper side to engage a suitably-formed wrench or spanner. The follower $p^8$ is removable from the nut, so that the packing can be readily removed and renewed.

I do not confine myself to the described improvement in connection with a combined door check and closer, or, in other words, to an apparatus which includes as a part of its structure a door-closing spring, as said improvement may be used in a door-check which is not provided with a spring-chamber and spring and is used to retard the closing movement of a door when said movement is caused by an independent spring applied at some other point, or perhaps to simply prevent slamming when the door has no spring applied to it or other closing means, but is to be manually operated.

I claim—

An apparatus of the character specified, comprising a casing having a liquid-space, a cylinder extending outwardly from said space, a flow by-pass and a return by-pass, said by-passes connecting the liquid-space with the outer portion of the cylinder, the flow by-pass having a valve which permits free movement of liquid from said space to the outer end of the cylinder and prevents a return movement of said liquid, while the return by-pass permits a restricted flow of liquid from the outer end of the cylinder to the liquid-space, a solid or valveless piston closely fitting said cylinder, a spindle operatively connected with the piston to reciprocate the latter, said piston constituting a closely-fitting partition, whereby transfer of liquid is prevented excepting through said by-passes, and means of connection between the spindle and door, whereby the opening of the door effects the retraction of the piston.

In testimony whereof I have signed my name to this specification, in the presence of two witnesses, this 14th day of March, 1896.

EUGENE IRVING BLOUNT.

Witnesses:
HORACE EATON,
MARY H. CORBETT.